(12) United States Patent
Walter et al.

(10) Patent No.: US 12,582,945 B2
(45) Date of Patent: Mar. 24, 2026

(54) METHOD FOR OPERATING A MIXING APPARATUS OF A MANUFACTURING PLANT

(71) Applicant: Fette Compacting GmbH, Schwarzenbek (DE)

(72) Inventors: Nicolas Walter, Hamburg (DE); Alexander Evers, Bargteheide (DE)

(73) Assignee: FETTE COMPACTING GMBH, Schwarzenbek (DE)

( * ) Notice: Subject to any disclaimer, the term of this patent is extended or adjusted under 35 U.S.C. 154(b) by 565 days.

(21) Appl. No.: 17/350,138

(22) Filed: Jun. 17, 2021

(65) Prior Publication Data

US 2021/0394133 A1  Dec. 23, 2021

(30) Foreign Application Priority Data

Jun. 17, 2020  (DE) ..................... 10 2020 115 919.6

(51) Int. Cl.
　　*B01F 3/18*　　　(2006.01)
　　*B01F 15/00*　　(2006.01)
　　　　　　(Continued)

(52) U.S. Cl.
　　CPC .......... *B01F 23/60* (2022.01); *B01F 35/2117* (2022.01); *B01F 35/832* (2022.01);
　　　　　　(Continued)

(58) Field of Classification Search
　　CPC ...... G01G 19/34; G01G 19/32; G05D 11/132; B01F 23/60
　　See application file for complete search history.

(56) References Cited

U.S. PATENT DOCUMENTS 5,114,630 A * 5/1992 Newman ................. C06B 21/00
　　　　　　　　　　　　　　　　　　102/292
5,132,897 A * 7/1992 Allenberg ............ G01G 11/086
　　　　　　　　　　　　　　　　　　702/179
(Continued)

FOREIGN PATENT DOCUMENTS

EP　　　0299065 A1　　1/1989
EP　　　2328929 A1　　11/2017
　　　　　　(Continued)

OTHER PUBLICATIONS

EP 20210174947; filed May 20, 2021; European Search Report dated Nov. 3, 2021 (8 pages).

(Continued)

*Primary Examiner* — Elizabeth Insler
(74) *Attorney, Agent, or Firm* — Barclay Damon LLP

(57)　　　　　　ABSTRACT

A method for operating a mixing apparatus of a manufacturing plant comprises supplying multiple powdered products to the mixing apparatus. An inlet mass flow rate of the multiple powdered products into the mixing apparatus and a weight of the multiple powdered products in the mixing apparatus are measured. The multiple powdered products in the mixing apparatus are mixed to form a mixed product. The weight of the multiple powdered products in the mixing apparatus and an outlet mass flow rate of the mixed product from the mixing apparatus are predicted based on the measured inlet mass flow of the multiple powdered products. The predicted outlet mass flow rate of the mixed product from the mixing apparatus is corrected based on the measured weight of the multiple powdered products in the mixing apparatus. The mixed product is processed into final products.

17 Claims, 2 Drawing Sheets

(51) Int. Cl.

| | |
|---|---|
| *B01F 15/04* | (2006.01) |
| *B01F 23/60* | (2022.01) |
| *B01F 35/21* | (2022.01) |
| *B01F 35/83* | (2022.01) |
| *B30B 11/00* | (2006.01) |
| *G01G 19/32* | (2006.01) |
| *G01G 19/393* | (2006.01) |
| *B01F 101/22* | (2022.01) |

(52) U.S. Cl.
    CPC ............ *B30B 11/005* (2013.01); *G01G 19/32* (2013.01); *G01G 19/393* (2013.01); *B01F 2101/22* (2022.01)

(56) References Cited

U.S. PATENT DOCUMENTS

| | | | |
|---|---|---|---|
| 5,148,943 A * | 9/1992 | Moller | B29B 7/603 |
| | | | 222/64 |
| 5,665,941 A | 9/1997 | Wehhofer et al. | |
| 2004/0002789 A1 | 1/2004 | Hachtel | |
| 2018/0271791 A1 * | 9/2018 | Myerson | A61J 3/10 |

FOREIGN PATENT DOCUMENTS

| | | | |
|---|---|---|---|
| JP | 1993-185432 A | 7/1993 | |
| WO | 2008149190 A1 | 12/2008 | |
| WO | 2013182870 A1 | 12/2013 | |

OTHER PUBLICATIONS

Sen, Maitraye, et al. "Multi-dimensional population balance modeling and experimental validation of continuous powder mixing processes", Chemical Engineering Science 80 (2012) 349-360, Jun. 23, 2012 (14 pages).

Toso, Peter, et al. "Detailed modeling and process design of an advanced continuous powder mixer", International Journal of Pharmaceutics 552 (2018) 288-300, Sep. 27, 2018 (14 pages).

Gao, Yijie, et al. "Characterizing continuous powder mixing using residence time distribution", Chemical Engineering Science 66 (2011) 417-425, Nov. 4, 2010 (10 pages).

Japanese Patent Office; Japanese Office Action; Patent Application No. P2021-098216; Dated: Jul. 16, 2024 (10 pages).

* cited by examiner

METHOD FOR OPERATING A MIXING APPARATUS OF A MANUFACTURING PLANT

CROSS REFERENCE TO RELATED INVENTION

This application is based upon and claims priority to, under relevant sections of 35 U.S.C. § 119, German Patent Application No. 10 2020 115 919.6, filed Jun. 17, 2020, the entire contents of which are hereby incorporated by reference.

FIELD OF TECHNOLOGY

The disclosure relates to a method for operating a mixing apparatus of a plant, in which powdered product is processed into final products, wherein different powdered products are supplied to the mixing apparatus, and wherein the different products are mixed to form a mixed product in the mixing apparatus before being processed into final products.

BACKGROUND

In plants of this kind, powdered products are processed into tablets or capsules, for example. Accordingly, the plants may for example comprise a tablet press or a capsule-filling machine. Plants of this kind often comprise multiple product inlets for powdered product to be processed in the plant. Furthermore, plants of this kind often comprise a mixing apparatus, in which the different products supplied are mixed to form the product to be processed. The mixed product is then supplied from the mixing apparatus to the production machine in order to be processed into the final products, for example a tablet press, for example a rotary tablet press, where the product mixture is processed, for example pressed into tablets. The finished final products then exit the plant via an outlet. Plants of this kind may be designed as continuous plants, in which, in contrast with a batch process, the product continuously supplied to the plant is continuously processed, for example into tablets or capsules. Furthermore, so-called containment plants are known, which largely prevent the egress of product dust into the surroundings by means of special sealing measures.

In continuously operating plants, in particular, the product supplied to the plant at the inlet needs to be assigned to final products manufactured in the plant. This is required if product is detected to be defective by sensors of the plant, for example. In this case, the final products, for example tablets or capsules, manufactured from said product must be discarded, wherein, where possible, only the final products manufactured from the corresponding product batch are to be discarded in order to prevent unnecessary wastage. The products therefore need to be tracked in the plant as well as in the individual components, in particular the mixing apparatus.

It is possible to measure the weight or mass of the product located in the mixing apparatus by means of weight or mass sensors. The mixing behavior can be predicted for the product tracking based on the information as to how much product is located in the mixing apparatus. However, for more comprehensive product tracking, it is desirable not only to detect the weight of the product in the mixing apparatus but also the mass flow rates in and out of the mixing apparatus. However, it is not currently possible to directly measure the mass flow rate leaving the mixing apparatus. The detection of the weight of the product located in the mixing apparatus, in particular by means of a load cell, is subjected to strong interference, especially in the case of horizontally oriented mixing apparatuses. Therefore, very slow filters are used such that the weight can still be determined in a reliable manner. However, on account of the low dynamic range of the filtered measuring signal, the product weight cannot be reliably detected outside the steady state of the system. The transient states of the system of the mixing apparatus are of particular relevance for product tracking.

Proceeding from the prior art outlined above, the object of the invention is to provide a method of the type mentioned at the outset by means of which the mass flow rates in and out of the mixing apparatus can be reliably determined. Furthermore, an object of the invention is to also enable product tracking in the mixing apparatus and also in the transient states in a simple and reliable manner.

BRIEF SUMMARY OF THE INVENTION

With regard to a method of the type mentioned at the outset, the invention solves the object in that the product inlet mass flow rate into the mixing apparatus and the weight or mass of the product located in the mixing apparatus are measured, in that the weight or mass of the product located in the mixing apparatus and the product outlet mass flow rate out of the mixing apparatus are predicted based on the measured product inlet mass flow rate using a mathematical model, and in that the prediction of the product outlet mass flow rate produced using the mathematical model is corrected using the measured weight or measured mass of the product located in the mixing apparatus.

Whenever reference is made in this context to the measurement or prediction of the product weight, it should be understood that the measurement or prediction of the product mass is also possible in this respect. The mixing apparatus is part of a plant. The plant additionally comprises a production machine, for example a tablet press, for example a rotary tablet press, or a capsule-filling machine, in which the product supplied to the plant or the product mixture produced in the mixing apparatus is processed into final products, for example tablets or capsules. The final manufactured products may for example be oral solid dosages (OSD). The plant comprises multiple product inlets for product to be processed in the plant. The mixing apparatus is used to mix different products supplied to the plant. The different products supplied to the mixing apparatus may for example be an active pharmaceutical ingredient (API), an excipient and/or a lubricant. The different products are supplied to the plant in particular via separate product inlets, by which they are supplied to the mixing apparatus, where they are mixed to form the product mixture to be processed. The mixing apparatus may for example comprise a mixing screw. As a result, the product can be conveyed at the same time as being mixed. The mixing screw may for example be arranged in a horizontally arranged screw housing such that it can rotate about an axis that also extends in a horizontal direction.

The product inlet mass flow rate of the two products to be mixed flowing into the mixing apparatus and the weight of the product located in the mixing apparatus are measured using suitable measuring apparatuses known per se. For this purpose, the mixing apparatus may comprise a corresponding weight-measuring apparatus, such as a load cell. The product inlet mass flow rate can be detected by means of a mass flow rate sensor arranged at the inlet of the mixing apparatus. This sensor measures the product mass flowing into the mixing apparatus per defined unit of time. According to the invention, the weight of the product located in the mixing apparatus and the product outlet mass flow rate of mixed product flowing out of the mixing apparatus are predicted based on the measured product inlet mass flow rate using a mathematical model. The prediction of the weight of the product located in the mixing apparatus is compared with the measured values of the weight-measuring apparatus. If the predicted value is identical to the measured value, it can be assumed that the predicted value for the product outlet mass flow rate will also be accurate. If, on the other hand, a discrepancy is identified between the predicted value and the measured value for the weight of the product located in the mixing apparatus, the predicted value for the product outlet mass flow rate is corrected in accordance with the discrepancy identified.

The invention is therefore based on the concept of verifying the prediction produced using the mathematical model by measuring one of the predicted parameters, namely the product weight in the mixing apparatus, and of correcting the prediction values if necessary, in particular the prediction of the unmeasurable value for the product outlet mass flow rate. The predictions and the correction of the predicted values are carried out, in particular, by means of an evaluation apparatus on the basis of evaluation algorithms.

Although the product outlet mass flow rate can in principle be calculated from the measured values for the product inlet mass flow rate and the weight of the product located in the mixing apparatus, this calculation is only reliable in the steady state of the system and not in the particularly relevant transient states for the reasons mentioned above. This problem is solved according to the invention in that the product weight located in the mixing apparatus and the product outlet mass flow rate are initially predicted solely based on the measured product inlet mass flow rate and the predicted values are only corrected in the event of discrepancies between the predictions for the weight of the product located in the mixing apparatus and the corresponding measured values. The mathematical model is used to represent the most probable state of the mixing apparatus. This state includes the weight of the product located in the mixing apparatus and also the product outlet mass flow rate. By virtue of the model, the weight of the product located in the mixing apparatus is available dynamically, yet with little interference. Equally, the product outlet mass flow rate flowing out is also available dynamically and with little interference, even without this value being measured. As such, according to the invention, the mixing behavior of the mixing apparatus can be determined precisely and dynamically both in stationary states (in the steady state of the system) and in transient states. As a result, this in turn allows for robust and consistently reliable product tracking in the mixing apparatus.

The following equation may be used as the mathematical model equation for the method according to the invention:

$$\frac{dm\_m}{dt} = \frac{dm\_d}{dt} - \frac{dm\_o}{dt}$$

with:
  m_m: Mass of the product located in the mixing apparatus
  m_d: Mass of the product flowing into the mixing apparatus m_o: Mass of the product flowing out of the mixing apparatus As a start condition for the mathematical modeling at the beginning of operation of the plant, m_m, m_d and m_o can each be set to zero. When operation of the plant begins, the measured product inlet mass flow rate into the mixing apparatus assumes positive values and the weight or mass of the product located in the mixing apparatus and the product outlet mass flow rate are predicted and then corrected based on the detected measured values for the product located in the mixing apparatus, for example using a Kalman filter method explained in more detail below. Accordingly, the predicted values converge successively to the actual values.

The mathematical model can also be viewed in a state-space representation. The state vector x is then:

$$x = \begin{pmatrix} m\_m \\ \dot{m}\_o \end{pmatrix}$$

with:

$$\dot{m}\_o = \frac{dm\_o}{dt}$$

The most probable state is determined for the state vector x based on the measured weight or measured mass of the product located in the mixing apparatus y=m_m.

The following then applies for y:

$$y = Cx$$

with:

$$C = (1 \ \ 0)$$

The mathematical model equation in the state-space representation is then:

$$\dot{x} = Ax + Bu$$

with:

$$\dot{x} = \frac{dx}{dt}$$

$$u = \dot{m}\_d = \frac{dm\_d}{dt}$$

$$A = \begin{pmatrix} 0 & -1 \\ 0 & 0 \end{pmatrix}$$

$$B = \begin{pmatrix} 1 \\ 0 \end{pmatrix}$$

As a start condition, the value zero is again assumed for m_m, m_d and m_o, and thus in particular x and y. Again, the mathematical model converges to the actual values when the plant starts up. In particular, at the start of operation of the plant, the measured product inlet mass flow rate into the mixing apparatus assumes positive values and the weight or mass of the product located in the mixing apparatus and the product outlet mass flow rate are predicted and successively corrected, for example using a Kalman filter method explained in more detail below.

According to one embodiment, the prediction of the weight of the product located in the mixing apparatus and of the product outlet mass flow rate and also the correction of the prediction of the product outlet mass flow rate may take place in real time. The real-time prediction and correction using a mathematical model allows for a comparison of the model with other sensor data of the plant, which increases the robustness and long-term stability of the model. According to a particularly practical embodiment, the prediction of the product outlet mass flow rate produced using the mathematical model may be corrected using the least squares method.

According to another embodiment, the prediction of the weight of the product located in the mixing apparatus and of the product outlet mass flow rate and also the correction of the prediction of the product outlet mass flow rate may be done using a KALMAN filter method. A KALMAN filter is a per se known mathematical method for iteratively estimating system parameters on the basis of erroneous observations. By means of a KALMAN filter method, system variables that cannot be measured directly can be estimated and measurement errors can be optimally reduced. It has been shown that a mathematical model of this kind can produce particularly reliable results.

As explained above, the different products of the mixing apparatus can be supplied to the system via multiple product inlets. According to another embodiment, the product inlets may each comprise at least one dosing apparatus, in particular a loss-in-weight dosing apparatus. Dosing apparatuses of this kind are used to supply product in doses. So-called loss-in-weight dosing apparatuses comprise a weighing apparatus and dose the product to be supplied based on a weight measurement of the product located in the dosing apparatus.

As already mentioned, the plant may be a plant for manufacturing tablets, wherein the mixed product coming out of the mixing apparatus is pressed into tablets in a tablet press. The tablet press may in particular be a rotary tablet press. The tablet press may be a containment press, i.e. a press that largely prevents the egress of product dust into the surroundings by means of special sealing measures. It is also possible for the plant to be a plant for manufacturing capsules, wherein the mixed product coming out of the mixing apparatus is filled into capsules in a capsule-filling machine.

According to another embodiment, the progress of the product in the mixing apparatus and/or plant can be tracked based on the measured values for the product inlet mass flow rate and for the weight of the product located in the mixing apparatus as well as the corrected prediction of the product outlet mass flow rate. As a result, a product batch detected to be defective can for example be tracked during its subsequent progress through the mixing apparatus and/or plant. Final products manufactured from the defective product batch can thus be reliably identified and discarded with minimal wastage.

According to another embodiment, for the tracking of the product progress, the product entering the mixing apparatus can be divided into mass units based on the measured values for the product inlet mass flow rate, wherein the progress of the mass units in the mixing apparatus is tracked using the corrected prediction of the product outlet mass flow rate. The product flow is thus divided into successive mass units based on the measurement data for the product inlet mass flow rate in an evaluation apparatus, in particular. The discharge of the relevant mass units from the mixing apparatus can be reliably tracked based on the values, corrected if applicable, for the product outlet mass flow rate provided by the method according to the invention. Mass-based product tracking has various advantages over, for example, time-based product tracking using dwell time models. In particular, it depends far less on the relevant operating point of the plant, i.e. the relevant operating parameters. It is therefore much easier to parameterize the model for product tracking, in particular in the event of a product change or other deviations from operating parameters once set. At the same time, particularly reliable product tracking is possible, and therefore final products manufactured from a defective product batch, for example, can be identified and discarded in a reliable and targeted manner. The mass units are moved through the plant in a manner similar to a shift register model in the evaluation unit. Mixing of different mass units so as to form new mass units in the mixing apparatus can be taken into consideration for the tracking of the progress of the mass units in the mixing apparatus. A mixing ratio implemented by the mixing apparatus may be taken into consideration when said mixing is taken into consideration. Therefore, new mass units containing the mixed product are formed from the mass units arriving at the mixing apparatus. The mixing ratio of the mixing apparatus in this context depends on the specification of the mixing apparatus and, if applicable, the supply rate of the individual products. The mixing ratio is therefore known for the relevant process and can be used accordingly when taking the mixing into consideration. If the mixing apparatus for example mixes two products uniformly in a ratio of 50% to 50%, the new mass units will each contain equal amounts of the first and second product. In the event of other mixing ratios implemented by the mixing apparatus, the new mass units can be allocated differently accordingly.

According to another embodiment, the products supplied via the product inlets may be divided into mass units based on measurement data from inlet mass sensors arranged at the product inlets, and the progress of the mass units in the plant may be tracked using measurement data from at least one other mass sensor of the plant. In this regard, the loss-in-weight dosing apparatuses mentioned above are particularly suitable. In this case, the weighing apparatus already provided can be used directly as the inlet mass sensor.

According to another embodiment, the progress of the mass units in the plant can be tracked using measurement data from another mass sensor arranged at a tablet outlet of a tablet press. Said other mass sensor may for example be a sensor by means of which the number of tablets discharged from the tablet press is counted. The weight of these tablets can be assumed to be known for a given process. Therefore, counting the tablets indirectly gives their weight or mass. Of course, it is also possible for the other mass sensor to count and weigh the discharged tablets. In the embodiment given above, the tablets manufactured are directly assigned to a corresponding mass unit at the inlet and thus to a corresponding product batch.

According to another embodiment, the progress of the mass units in the plant may be tracked using measurement data from another mass sensor arranged at an outlet of a capsule-filling machine. Said other mass sensor may for example be a sensor by means of which the number of capsules discharged from the capsule-filling machine is counted. The weight of these capsules can, again, be assumed to be known for a given process. Thus, again, counting the capsules indirectly gives their weight or mass. Of course, it is also possible for the other mass sensor to count and weigh the discharged capsules. According to another embodiment, the masses of the mass units may be equal. If all mass units have the same mass, this simplifies the tracking process, in particular the algorithms used for the product tracking.

The mass units should have a sufficiently low mass to enable reliable and precise product tracking while also preventing unnecessary wastage. According to a related embodiment, the mass of the mass units may be in a range of from 1 g to 20 g, preferably in a range of from 1 g to 10 g. In particular, all mass units may have the same mass, wherein this same mass for all mass units is then a mass within the above-mentioned ranges.

The plant may be a plant for continuously processing the powdered product into final products, for example for continuously manufacturing tablets or filling capsules. As is known per se, in plants for continuous manufacture, unlike in a batch process, the product is continuously supplied into the plant, where it is continuously mixed in a mixing apparatus and continuously processed into final products. Plants of this kind may theoretically operate without stopping, it only being necessary to ensure that sufficient product is fed to the product inlets. They have various advantages over batch plants that are known per se to a person skilled in the art. In plants of this kind for continuous manufacture, in particular, precise and high-resolution product tracking of the like guaranteed by the invention is of considerable importance.

Moreover, the plant may be a so-called containment plant, which largely prevents the egress of product dust from the plant by virtue of special sealing measures. The containment level of a plant is determined, for example, according to the so-called SMEPAC test (Standardized Measurement of Equipment Particulate Airborne Concentration). The plant used in the method according to the invention may for example have a containment level according to the SMEPAC test of 10 to 100 $\mu g/m^3$ or less than 10 $\mu g/m^3$.

BRIEF DESCRIPTION OF THE DRAWINGS

An exemplary embodiment of the invention is explained below in greater detail with reference to figures, wherein.

The same reference numbers refer to the same objects in the figures unless indicated otherwise.

DETAILED DESCRIPTION OF THE INVENTION

Figure 1:
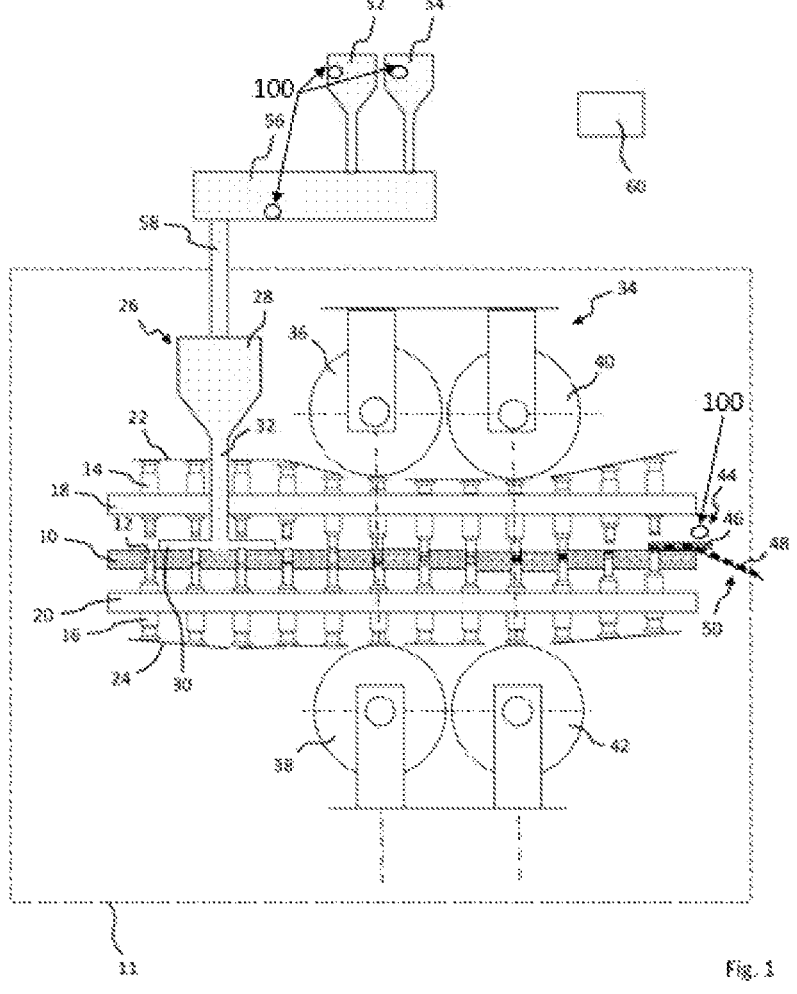
FIG. 1 illustrates a partial schematic depiction of an embodiment of a plant used in an embodiment of a method for manufacturing tablets with a tablet press.

The plant shown in FIG. 1 is a plant or system for manufacturing tablets in which powdered product is pressed into tablets. The plant accordingly comprises a rotary press, in particular a rotary tablet press, arranged in a housing 11, with a rotor that is rotationally driven by a rotary drive and that has a die plate 10 comprising a plurality of receiving means 12. The receiving means 12 may for example be in the form of holes in the die plate 10. Furthermore, the rotor comprises a plurality of upper punches 14 and lower punches 16 that rotate synchronously with the die plate 10. The upper punches 14 are axially guided in an upper punch guide 18 and the lower punches 16 are axially guided in a lower punch guide 20. The axial movement of the upper punches 14 and lower punches 16 during the rotation of the rotor is controlled by upper control cam elements 22 and lower control cam elements 24. The rotary press further comprises a filling apparatus 26, which comprises a filling reservoir 28 and a filling chamber 30, which are connected via a filling pipe 32. In this way, the powdered filling material in the present example passes under the force of gravity from the filling reservoir 28 via the filling pipe 32 into the filling chamber 30, and passes therefrom via a filling opening provided in the bottom side of the filling chamber 30 into the receiving means 12 of the die plate 10, again under the force of gravity.

The rotary press further comprises a pressing apparatus 34. The pressing apparatus 34 has a pre-pressing apparatus having an upper pre-pressing roller 36 and a lower pre-pressing roller 38, as well as a main pressing apparatus having an upper main pressing roller 40 and a lower main pressing roller 42. Furthermore, the rotary press comprises an ejection apparatus 44 and a scraping apparatus 46 having a scraping element, which supplies the tablets 48 produced in the rotary press to a discharge apparatus 50 for discharging the tablets from the rotary press. The scraping apparatus 46 may for example comprise a preferably crescent-shaped scraping element, which scrapes tablets 48 conveyed by means of the lower punches 16 onto the top side of the die plate 10 off the die plate 10 in the region of the ejection apparatus 44 and supplies them to the discharge apparatus 50.

The housing 11 may be at a positive or negative pressure with respect to the surroundings of the housing 11. Moreover, the housing 11 may be sealed with respect to the surroundings. The rotary press may be a so-called containment press.

It is expressly noted that the rotary press shown in FIG. 1 and having the properties detailed above is merely exemplary. In principle, any other tablet press is suitable for the invention. Indeed, any other type of production machine in which powdered product is processed into final products is, in principle, also suitable for the invention, for example a capsule-filling machine, in which powdered product is filled into capsules.

In the example shown, the plant further comprises two product inlets 52, 54 for two different products, for example an active pharmaceutical ingredient and an excipient, to be supplied to the tablet press in order to be pressed into tablets 48. The product inlets 52, 54 may for example comprise dosing apparatuses, in particular loss-in-weight dosing apparatuses. The products supplied arrive from the product inlets 52, 54 at a mixing apparatus 56 of the plant, in which the products are mixed to form a product mixture to be pressed. The mixing apparatus 56 may for example comprise a mixing screw. In the example shown, the mixing apparatus 56 is oriented horizontally. In particular, an axis of rotation of a mixing screw of the mixing apparatus 56 extends in a horizontal direction. The housing of the mixing apparatus 56 is also oriented horizontally. The mixed product leaving the mixing apparatus 56 is supplied via a supply line 58 to the filling reservoir 28 of the filling apparatus 26. The plant additionally comprises an evaluation and control apparatus 60 for controlling the operation of the plant and for carrying out the method according to the invention on the basis of evaluation algorithms stored in the evaluation and control apparatus 60. One or more sensors 100 may be positioned throughout the manufacturing plant or manufacturing line. The sensors 100 may be weight sensors, mas flow sensors, load cells or other similar sensors. The product inlets 52, 54, the filling apparatus 26 and the tablet press, in particular a tablet outlet 44 of the tablet press, may each comprise at least one weight sensor, by means of which the weight of product guided through the plant or tablets discharged from the plant can be determined directly or indirectly, respectively. The mixing apparatus 56 also comprises, at the inlets thereof, mass flow rate sensors, by means of which the product inlet mass flow rate of the product flowing into the mixing apparatus 56 from the product inlets 52, 54 is measured. Moreover, the mixing apparatus 56 comprises a load cell, by means of which the weight of the product located in the mixing apparatus 56 is measured. The evaluation and control apparatus 60 is connected to the mass flow rate sensors for measuring the product inlet mass flow rate, to the load cell for measuring the weight of the product located in the mixing apparatus 56 and to the mass sensors and, if applicable, to other sensors of the plant. In particular, it receives measurement data from the sensors and uses said data as the basis for the control and evaluation. For this purpose, the evaluation and control apparatus 60 may be connected to all components of the plant via corresponding connection lines.

Figure 2:
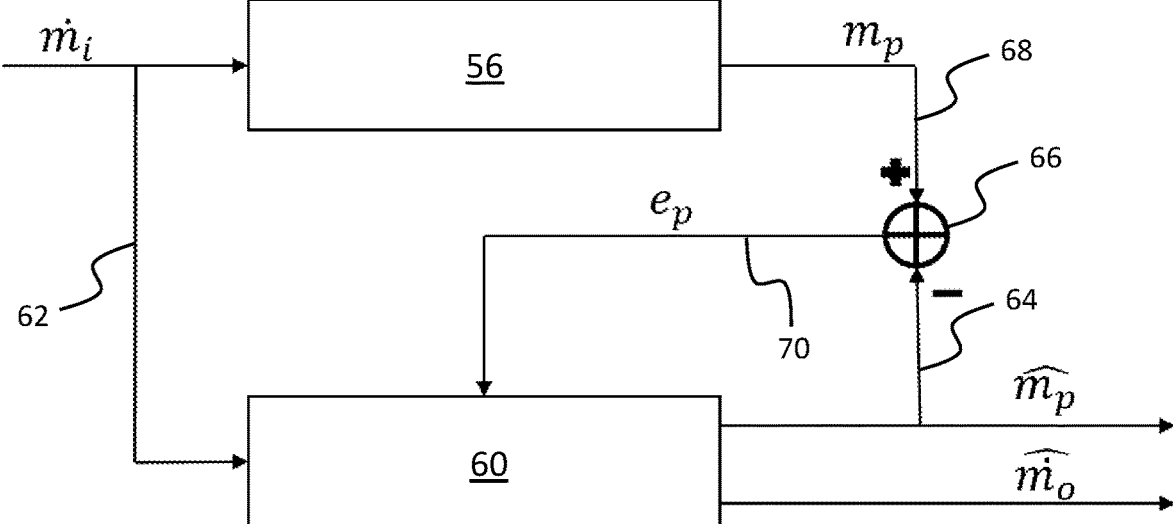
FIG. 2 illustrates is a schematic representation of an embodiment of the method for manufacturing tablets with a tablet press.

The method according to the invention will be explained in greater detail below with reference to the diagram in FIG. 2. In FIG. 2, $\dot{m}_i$ denotes the product inlet mass flow rate out of the product inlets 52, 54 measured by the mass sensors of the mixing apparatus 56. This measured value is applied to the evaluation and control apparatus 60, as shown by the arrow 62 in FIG. 2. Based on the measured value for the product inlet mass flow rate $\dot{m}_i$ the evaluation and control apparatus 60 calculates a predicted value for the weight of the product located in the mixing apparatus 56 using a mathematical model. This value is denoted by $\widetilde{m}_p$ in FIG. 2. Moreover, the evaluation and control apparatus 60 calculates a predicted value for the product outlet mass flow rate of the mixed product out of the mixing apparatus 56 based on the measured product inlet mass flow rate $\dot{m}_i$. This value is denoted by $\widetilde{m}_e$.

As illustrated by the arrow 64 in FIG. 2, the predicted value for the weight of the product $\widetilde{m}_p$ located in the mixing apparatus 56 is applied to a comparison apparatus 66, which may also be part of the evaluation and control apparatus 60. The value for the weight of the product located in the mixing apparatus 56 measured by the load cell is also applied to the comparison apparatus 66, as shown by the arrow 68. This measured value is denoted by $m_p$. If the comparison apparatus 66 detects a difference between the measured value $m_p$ and the predicted value $\widetilde{m}_p$, this is provided to the evaluation and control apparatus 60 as a calculation error $e_p$, as illustrated by the arrow 70. Based on this calculation error $e_p$, the evaluation and control apparatus 60 corrects the calculated prediction value for the product outlet mass flow rate $\widetilde{m}_e$ according to the mathematical model. This method, described with reference to FIG. 2, may run permanently during operation of the mixing apparatus or plant.

The above-described prediction of the weight of the product located in the mixing apparatus and of the product outlet mass flow rate out of the mixing apparatus 56 as well as the correction of the prediction of the product outlet mass flow rate are preferably carried out using a KALMAN filter method. By virtue of the method according to the invention, product tracking in the plant and in particular the mixing apparatus 56 can be carried out in a reliable manner and also outside of stationary states, in particular in transient states.

For the product tracking, it is also possible for the product fed into the plant via the product inlets 52, 54 to be divided into mass units of equal size based on measurement data from inlet mass sensors, for example mass or weight sensors of loss-in-weight dosing apparatuses, arranged at the product inlets 52, 54. In the dispersion zone created by the mixing apparatus 56, new mass units that contain product portions in each case from two mass units of the two product inlets 52, 54 in accordance with the known supply ratio into the mixing apparatus 56 are then formed in the evaluation and control apparatus 60 from the mass units of the two product inlets 52, 54. The mixing of the constituents of the mass units in the dispersion zone created by the mixing apparatus 56 is taken into consideration in accordance with the also known, for example empirically determined, mixing ratio of the mixing apparatus 56. Based on the product outlet mass flow rate predicted and, if applicable, corrected using the method according to the invention, the mass units can accordingly be tracked further at the outlet of the mixing apparatus 56. The progress of these mass units through the plant, in particular to the tablet press 62, is tracked further for example using measurement data from a mass sensor arranged in the filling apparatus 26 of the tablet press. The ejected tablets 48 can be assigned to specific mass units previously fed to the plant via the product inlets 52, 54 and thus to the corresponding product batch by means of another mass sensor that is for example arranged at the outlet of the tablet press and that counts the ejected tablets and, if applicable, also measures the weight thereof. If, for example, one or more mass units are detected to be defective during the course of their progress through the plant by sensors of the plant, it is therefore possible in this manner to reliably identify the tablets manufactured from these mass units such that these tablets can be discarded. On account of the method according to the invention, this type of mass-based product tracking can be carried out in a reliable manner at any time, even and especially in transient states.

The mass units may all have the same mass. The mass of the mass units may preferably be less than 20 g, more preferably less than 10 g, for example approximately 1 g. The plant is in particular a plant for manufacturing tablets continuously, and it may be a containment plant.

LIST OF REFERENCE SIGNS

10 Die plate
11 Housing
12 Receiving means
14 Upper punches
16 Lower punches
18 Upper punch guide
20 Lower punch guide
22 Upper control cam elements
24 Lower control cam elements
26 Filling apparatus
28 Filling reservoir
30 Filling chamber
32 Filling pipe
34 Pressing apparatus
36 Upper pre-pressing roller
38 Lower pre-pressing roller
40 Upper main pressing roller
42 Lower main pressing roller
44 Ejection apparatus
46 Scraping apparatus
48 Tablets
50 Discharge apparatus
52 Product inlet
54 Product inlet
56 Mixing apparatus
58 Supply line
60 Evaluation and control apparatus
62 Arrow
64 Arrow
66 Comparison apparatus
68 Arrow
70 Arrow

The invention claimed is:

1. A method for operating a mixing apparatus of a manufacturing plant that is configured to manufacture at least one of tablets and capsules, the method comprising:

supplying multiple powdered products to the mixing apparatus, wherein the mixing apparatus extends along a horizontal axis;

measuring an inlet mass flow rate of the multiple powdered products into the mixing apparatus;

measuring a weight of the multiple powdered products in the mixing apparatus;

mixing the multiple powdered products in the mixing apparatus to form a mixed product, wherein the multiple powdered products are mixed in the mixing apparatus as the multiple powdered products travel along the horizontal axis;

predicting, using a mathematical model, the weight of the multiple powdered products in the mixing apparatus and an outlet mass flow rate of the mixed product from the mixing apparatus in a transient state based on the measured inlet mass flow of the multiple powdered products during a continuous processing of the multiple powder products;

determining a correction of the predicted outlet mass flow rate of the mixed product from the mixing apparatus based on the measured weight of the multiple powdered products in the mixing apparatus;

imputing the corrected outlet mass flow rate into a next prediction; and processing the mixed product into the final products comprising at least one of:

pressing the mixed product into the tablets in a tablet press; and filling the capsules with the mixed product in a capsule-filling machine, wherein with each correction, the predicted outlet mass flow rate of the mixed product based on the measured weight of the multiple powdered products in the mixing apparatus results in the weight of the multiple powdered products in the mixing apparatus and an outlet mass flow rate of the mixed product from the mixing apparatus converging to actual values for the transient state.

2. The method according to claim 1, wherein the predicting of the weight of the multiple powdered products in the mixing apparatus and of the outlet mass flow rate of the multiple powdered products from the mixing apparatus take place in real time.

3. The method according to claim 2, wherein the correcting of the prediction of the outlet mass flow rate of the multiple powdered products from the mixing apparatus take place in real time.

4. The method according to claim 1, wherein the correcting of the prediction of the outlet mass flow rate of the multiple powdered products from the mixing apparatus uses a least squares method.

5. The method according to claim 1, wherein a Kalman filter method is used in the predicting of the weight of the multiple powdered products in the mixing apparatus, the predicting of the outlet mass flow rate of the multiple powdered products from the mixing apparatus, and the correcting of the prediction of the outlet mass flow rate of the multiple powdered products from the mixing apparatus.

6. The method according to claim 1, wherein the multiple powdered products are supplied to the mixing apparatus via multiple product inlets, wherein the mixing apparatus comprises a mixing screw that extends along the horizontal axis.

7. The method according to claim 6, wherein the multiple product inlets each comprise at least one dosing apparatus.

8. The method according to claim 7, wherein the at least one dosing apparatus comprises a loss-in-weight apparatus.

9. The method according to claim 1, wherein progression of the powdered products and mixed product through at least one of: (1) the mixing apparatus; and (2) the manufacturing plant is tracked based on the measured inlet mass flow rate of the multiple powdered products into the mixing apparatus, the measured weight of the multiple powdered products in the mixing apparatus, and the corrected prediction of the outlet mass flow rate of the mixed product from the mixing apparatus.

10. The method according to claim 9, further comprising:

dividing the multiple powdered products entering the mixing apparatus into mass units based on the measured inlet mass flow rate of the multiple powdered products into the mixing apparatus; and tracking progression of the mass units through the mixing apparatus using the corrected prediction of the outlet mass flow rate of the mixed product from the mixing apparatus.

11. The method according to claim 10, further comprising:

dividing the supplied multiple powdered products into mass units based on measurement data from inlet mass sensors arranged at multiple product inlets; and tracking progression of the mass units through the manufacturing plant using the measurement data from at least one other mass sensor at a different position from the multiple product inlets.

12. The method according to claim 11, wherein tracking the progression of the mass units further uses measurement data from another mass sensor arranged at a tablet outlet of the tablet press.

13. The method according to claim 10, wherein masses of the mass units are equal.

14. The method according to claim 10, wherein masses of the mass units are in a range from 1 g to 20 g.

15. The method according to claim 1, wherein the manufacturing plant is a containment plant.

16. The method of claim 1, wherein the correcting the predicted outlet mass flow rate of the mixed product from the mixing apparatus based on the measured weight of the multiple powdered products in the mixing apparatus is done using a mathematical model to correct for deviations between the predictions for the weight of the product located in the mixing apparatus and the corresponding measured values.

17. The method of claim 1, wherein the inlet mass flow rate of product flowing into the mixing apparatus is continuously measured, and wherein powder product is continuously introduced into and mixed in the mixing apparatus.

* * * * *